United States Patent
Li et al.

(10) Patent No.: US 11,560,503 B2
(45) Date of Patent: Jan. 24, 2023

(54) STABLE SALT HYDRATE-BASED THERMAL ENERGY STORAGE MATERIALS

(71) Applicant: UT-Battelle, LLC, Oak Ridge, TN (US)

(72) Inventors: Yuzhan Li, Oak Ridge, TN (US); Kyle R. Gluesenkamp, Oak Ridge, TN (US); Monojoy Goswami, Oak Ridge, TN (US); Navin Kumar, Oak Ridge, TN (US); Timothy J. Laclair, Oak Ridge, TN (US); Orlando Rios, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 11 days.

(21) Appl. No.: 17/229,035

(22) Filed: Apr. 13, 2021

(65) Prior Publication Data

US 2021/0340423 A1 Nov. 4, 2021

Related U.S. Application Data

(60) Provisional application No. 63/010,081, filed on Apr. 15, 2020.

(51) Int. Cl.
*C09K 5/06* (2006.01)

(52) U.S. Cl.
CPC ................. *C09K 5/063* (2013.01)

(58) Field of Classification Search
CPC .. C09K 5/02; C09K 5/06; C09K 5/063; F28D 20/02; Y02E 60/14
See application file for complete search history.

(56) References Cited

U.S. PATENT DOCUMENTS

| | | | | |
|---|---|---|---|---|
| 5,709,945 A * | 1/1998 | Lee | ........................... | C09K 5/06 252/70 |
| 6,757,486 B2 * | 6/2004 | Hirano | .................... | F28D 20/02 165/10 |
| 8,329,078 B2 * | 12/2012 | Gueret | ................... | C09K 5/063 264/117 |
| 9,963,627 B2 * | 5/2018 | Rajagopalan | ......... | F28D 20/023 |
| 10,308,855 B2 | 6/2019 | Bissell et al. | | |
| 2014/0242127 A1* | 8/2014 | Yokozeki | ................. | A61K 8/11 424/59 |
| 2015/0360842 A1* | 12/2015 | Bessho | .................... | F25D 3/04 312/236 |

FOREIGN PATENT DOCUMENTS

| | | | | |
|---|---|---|---|---|
| CN | 107216859 A | * | 9/2017 | ............. C09K 5/063 |
| CN | 109666456 A | * | 4/2019 | ............. C09K 5/02 |
| CN | 109749715 A | * | 5/2019 | ............. C09K 5/063 |
| CN | 110819311 A | * | 2/2020 | ............. C09K 5/063 |
| JP | 61022194 A | * | 1/1986 | ............. C09K 5/063 |
| JP | 61136576 A | * | 6/1986 | |
| JP | 6284627 B2 | * | 2/2018 | ............. C09K 5/063 |
| KR | 100291100 B1 | * | 10/2001 | ............. C09K 5/063 |
| KR | 101594164 B1 | * | 3/2016 | ............. C09K 5/063 |

OTHER PUBLICATIONS

Cabeza et al. ("Thermal performance of sodium acetate trihydrate thickened with different materials as phase change energy storage material", Applied Thermal Engineering, 23, 2003, 1697-1704) (Year: 2003).*

Fashandi et al. ("Sodium acetate trihydrate-chitin nanowhisker nanocomposites with enhanced phase change performance for thermal energy storage", Solar Energy Materials and Solar Cells, 178, 2018, 259-265) (Year: 2018).*

Oh et al. ("Effect of micro- and nanofibrillated cellulose on the phase stability of sodium sulfate decahydrate based phase change material", Cellulose, 2020, 27, 5003-5016) (Year: 2020).*

Hirschey et al., Review of Inorganic Salt Hydrates with Phase Change Temperature in Range of 5° C to 60° C and Material Cost Comparison With Common Waxes, 5th International High Performance Buildings Conference at Purdue, Jul. 9-12, 2018, 3653, pp. 1-10.

Moon et al., Cellulose nanomaterials review: structure, properties and nanocomposites, Chem. Soc. Rev., 2011, 40, pp. 3941-3994.

Willfahrt et al., Printable acid modified corn starch as non-toxic, disposable hydrogel polymer electrolyte in supercapacitors, Applied Physics A, 2019, 125:474, 10 pages.

Xie et al., Inorganic Salt Hydrate for Thermal Energy Storage, Applied Sciences 2017, 7, 1317; doi:10.3390/app7121317, pp. 1-18.

* cited by examiner

*Primary Examiner* — Matthew R Diaz

(74) *Attorney, Agent, or Firm* — Warner Norcross + Judd LLP

(57) ABSTRACT

A phase change material composition for latent heat storage is provided. In one embodiment, the phase change material includes a salt hydrate having a melting temperature ($T_m$) of from 1° C. to 100° C. as determined in accordance with ASTM E793. The phase change material further includes a stabilizing matrix including a polysaccharide selected from the group of a nanocellulose, a sulfonated polysaccharide, a starch, a glycogen, a chitin, and combinations thereof. A composite article including the phase change material composition is also provided.

10 Claims, 16 Drawing Sheets

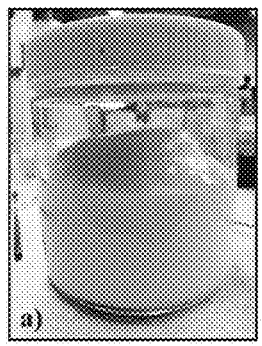
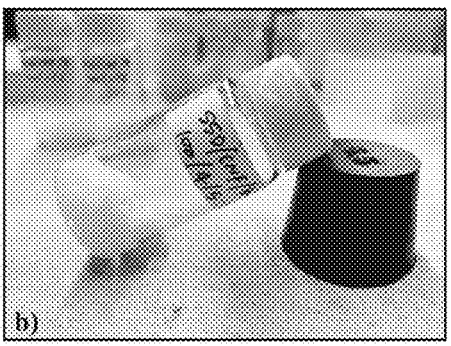
FIG. 2A   FIG. 2B   FIG. 2C
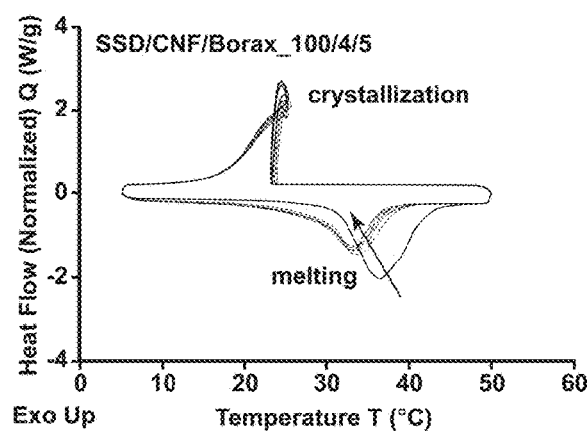
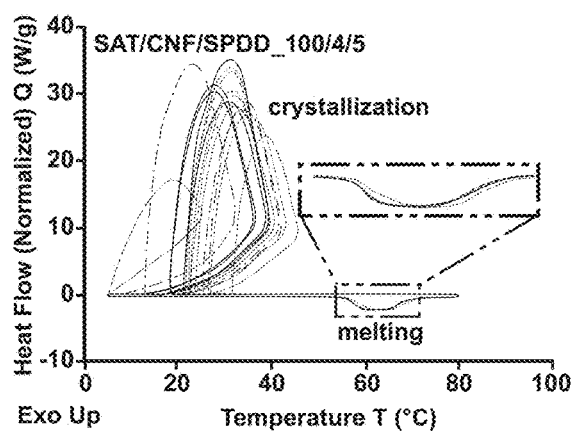
FIG. 3A   FIG. 3B

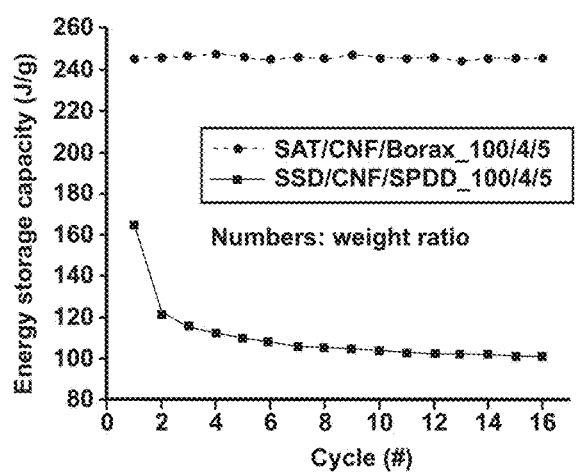
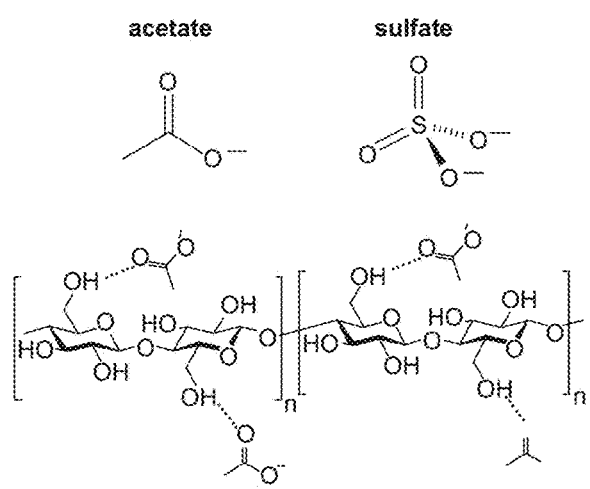
FIG. 4A                    FIG. 4B

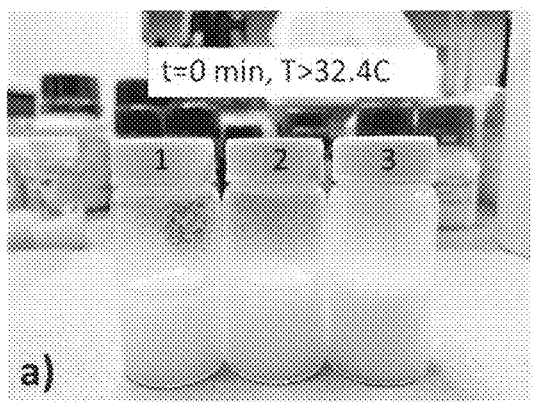
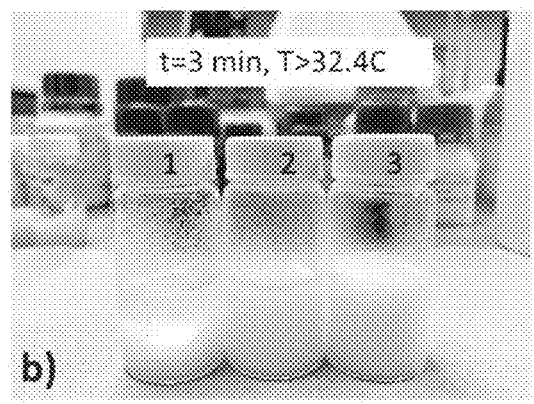
FIG. 11A  FIG. 11B
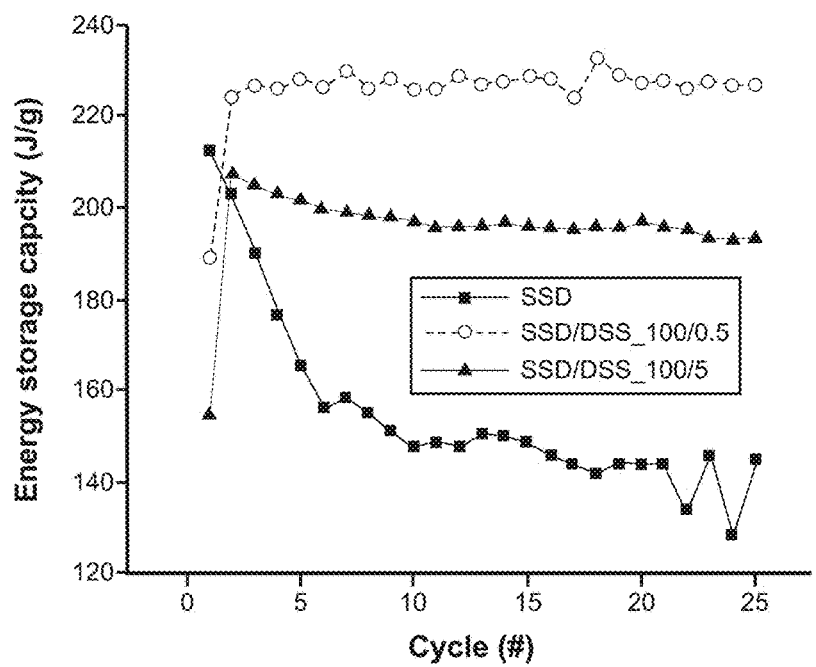
FIG. 11C

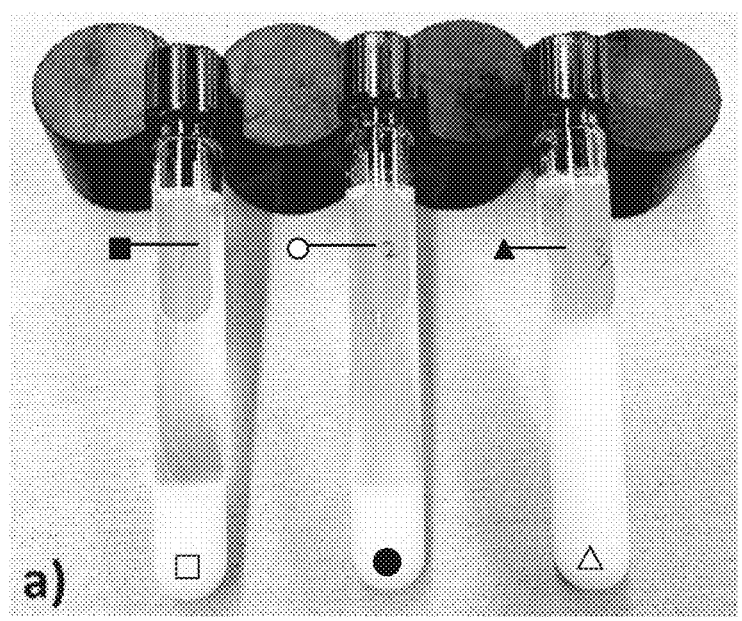
FIG. 14A
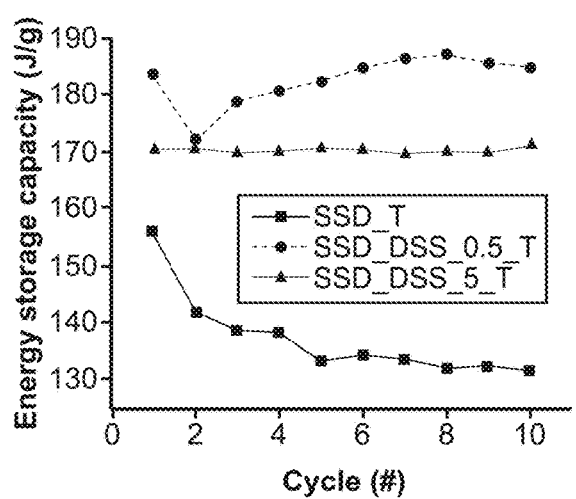
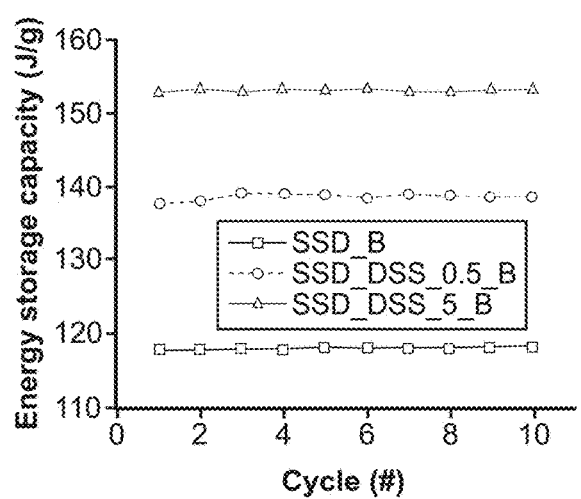
FIG. 14B      FIG. 14C

STABLE SALT HYDRATE-BASED THERMAL ENERGY STORAGE MATERIALS

CROSS-REFERENCE TO RELATED APPLICATIONS

This application claims the benefit of U.S. Provisional Application 63/010,081, filed Apr. 15, 2020, the disclosure of which is incorporated by reference in its entirety. invention.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to phase change material composition for latent heat storage and a composite material comprising the same.

BACKGROUND OF THE INVENTION

Phase change material (PCM) has been used in a range of thermal storage and temperature control applications for many years. New approaches and applications are continually being developed, which have led to many technologies that take advantage of thermal energy storage for improved energy efficiency at low cost. PCMs can provide thermal mass to dampen temperature extremes for any thermally cyclic system. This is important to thermally sensitive systems where large and sudden temperature swings are undesirable. Examples include incorporation of PCMs into building envelopes and materials, clothing and textiles, electronics, batteries, solar photovoltaics, and HVAC and refrigeration systems.

Paraffins are the most commonly deployed PCM today. With a typical material cost of 20-40 $/kWh, they are too expensive for most building applications (whether for envelope or equipment). Although many inexpensive salt hydrates are known and exhibit high thermal energy storage density, the widespread use of salt hydrate-based PCMs has been prevented by various technical challenges including, but not limited to, phase separation (i.e., incongruency), which results in significant degradation of the PCM's thermal energy storage capacity over extended freeze/melt cycles.

The latent heat of a PCM is the thermal energy required to complete a change of phase of the PCM at its melting/freezing point. When a salt hydrate undergoes melting, water molecules present in the crystal structure of the solid are released and become liquid water; an aqueous salt solution is formed as a result of this transformation. If the salt is completely soluble in the released water, the salt hydrate is said to melt congruently. If the salt is only partially soluble, some anhydrous salt will form along with a saturated salt solution. In this case, the salt hydrate is said to melt incongruently, and the anhydrous salt will precipitate from the solution. Due to differences in density between the salt solution and the solid anhydrous salt, the solid particles tend to separate and settle out of the saturated aqueous solution. This phenomenon is referred to as phase separation. Upon freezing, water molecules reform the aforementioned crystal structure with the dissolved salt ions. One melting and one freezing process constitutes a thermal cycle. For incongruently melting salt hydrates, the anhydrous salt that separated upon melting may not reform with the water present into the original salt hydrate crystal structure. Instead, the anhydrous salt remains separated from the newly formed salt hydrate, and saturated aqueous solution or water will also remain. As such, the latent heat associated with the freezing process is less than that associated with the previous melting process since less material actually undergoes the phase transition during the freezing due to the phase separation. This represents a degradation of thermal energy storage capacity of the material upon thermal cycling. Repeated thermal cycling can exacerbate the degradation as phase separation continues.

It has been observed that high viscosity cooling resulted in the formation of order phase structures, which was not present under low viscosity cooling condition. Attempts have been made to introduce increase the viscosity of the PCM composition to mitigate phase separation of salt hydrate PCMs. For example, crosslinked sodium polyacrylate (SPA) can prevent settling of the anhydrous salt during thermal cycling. When SPA is added into water, the sodium dissociates from the carbonyl group, creating carboxyl (COO—) and sodium (Na+) ions. The carboxyl groups repel each other because of the negative charges, which results in an expansion of the polymer network. The expansion allows more water molecules to be absorbed into the network, leading to the formation of a gel. However, the swelling capacity of SPA is significantly reduced when used in salt solution due to the change of osmotic pressure. Consequently, only a portion of the salt solution is absorbed and thickened by the SPA and the rest remains as a low viscosity liquid that will eventually undergo phase separation.

Accordingly, there remains a continued need for an improved phase change material composition for latent heat storage and a composite material comprising the same.

SUMMARY OF THE INVENTION

A phase change material composition for latent heat storage is provided. In one embodiment, the phase change material comprises a salt hydrate having a melting temperature ($T_m$) of from 1° C. to 100° C. as determined in accordance with ASTM E794. The phase change material further comprises a stabilizing matrix comprising a polysaccharide selected from the group of a nanocellulose, a sulfonated polysaccharide, a starch, a glycogen, a chitin, and combinations thereof.

In another embodiment, a composite material adapted to be in the presence of an energy source is also provided. The energy source is adapted to provide heat. The composite material comprises a support adapted to be in thermal communication with the energy source. The composite material further comprises the phase change material composition. The phase change material composition is disposed within the support. The heat generated by the energy source has a temperature greater than the melting temperature of the phase change material.

In various embodiments, a method of making stable thermal energy storage materials using eco-friendly polysaccharides as a matrix to host salt hydrate-based phase change material (PCM) is provided. The developed composition is form-stable and exhibits excellent thermal cycling stability and high energy storage capacity, enabled by combined physical and chemical interactions between the polysaccharide matrix and the ions from salt hydrate. The developed method can be applied to any salt hydrate-based PCM through appropriate modifications of the polysaccharide to introduce desired interactions. The developed method uses low-cost feedstock materials and a simple manufacturing process.

In some embodiments, a method that utilizes polysaccharide as a matrix to host the salt hydrate PCM, which mitigates phase separation of the PCM through combined physical thickening and chemical stabilization. Polysaccharides are long chains of carbohydrate molecules, specifically polymeric carbohydrates composed of monosaccharide units bound together by glycosidic bonds (FIG. 5). Examples include starch, glycogen, cellulose, and chitin. Polysaccharides are commonly used as thickeners in the food and cosmetic industries because of their high molecular weight and entangled polymer chains.

These and other features and advantages of the present invention will become apparent from the following description of the invention, when viewed in accordance with the accompanying drawings and appended claims.

BRIEF DESCRIPTION OF THE DRAWINGS

FIGS. 2A, 2B, 2C, 3A, 3B, 4A, 4B, 5A, 5B, 6A, 6B, 6C, 6D, 7A, 7B, 8A, 8B, 8C, 9A, 9B, 10, 11A, 11B, 11C, 12A, 12B, 13A, 13B, 14A, 14B, 14C, 15A, 15B, 15C, 16A, 16B, 17A, 17B, 17C, 17D, 18, and 19 are pictures and diagrams illustrating non-limiting embodiments of evaluations of comparative and exemplary phase change material compositions.

DETAILED DESCRIPTION OF THE CURRENT EMBODIMENTS

Figure 1A:
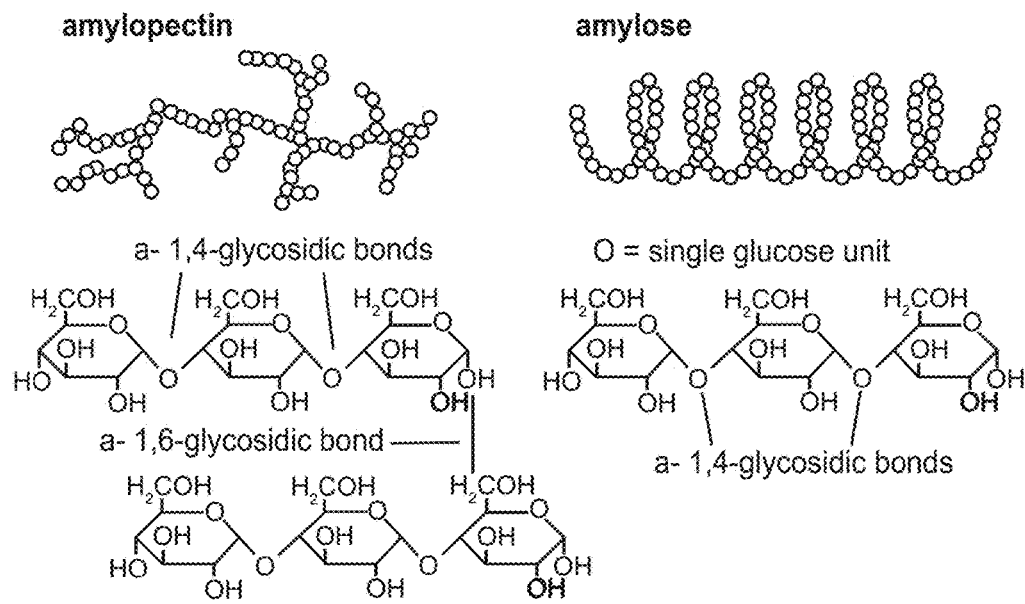
FIGS. 1A and 1B are diagrams illustrating non-limiting embodiments of a stabilizing matrix for a phase change material composition.

A phase change material composition for latent heat storage, and a composite material comprising the same, is provided. The phase change material composition is form-stable, and as a result, exhibits excellent thermal cycling stability and high energy storage capacity. The composite material comprising the phase change material composition is suitable in a variety of applications including, but not limited to, any application in which thermal energy storage is desirable.

The phase change material composition comprises a salt hydrate and a stabilizing matrix. The stabilizing matrix comprises a polysaccharide selected from the group of a nanocellulose, a sulfonated polysaccharide, a starch, a glycogen, a chitin, and combinations thereof. Without being bound by theory, it is believed that the excellent thermal cycling stability and high energy storage capacity exhibited by the phase change material is at least due to physical and chemical interactions between the polysaccharide stabilizing matrix and the ions from the salt hydrate.

As one non-limiting example of a physical interaction, during phase transformation of the salt hydrate, the polysaccharide of the stabilizing matrix can physically trap the ionic solution and anhydrous salt that result from the phase transformation to prevent phase separation. In various embodiments, the thickening efficiency of this physical interaction is not substantially affected by the high ionic strength of the composition. As one non-limiting example of a chemical interaction, polysaccharides contain large numbers of hydroxyl groups, which can directly interact with water molecules and ions of some salt hydrates through hydrogen bonding or can be chemically modified to introduce desired interactions with the ions of other salt hydrates. This combined physical absorption and chemical interaction allow for an improved shape stability and thermal cycling stability of the phase change material composition.

Salts hydrates are the result of an anhydrous salt forming a solid crystalline structure in the presence of water in specific molar ratios. Depending on the ionic structure of the salt, there is a finite number of hydrates that can form and often only one or two is thermodynamically stable. For example, calcium chloride ($CaCl_2$) forms two hydrates: the hexahydrate ($CaCl_2.6H_2O$) and tetrahydrate ($CaCl_2.4H_2O$). In this example, the two calcium chloride hydrates have different melting temperatures that depend on the water content; the hexahydrate ($CaCl_2.6H_2O$) has a melting temperature of about 30° C. whereas the tetrahydrate ($CaCl_2.4H_2O$) has a melting temperature of about 44° C.

Salt hydrates melt when the solid crystal structure releases its water and forms an aqueous solution. In many cases, the stoichiometric water content present in a hydrate is not sufficient to allow the anhydrous salt to dissolve completely into a homogeneous aqueous solution. The salt's insolubility in the stoichiometric water of its hydrate causes incongruent melting, whereby anhydrous salt settles out of solution and fails to recombine with water upon freezing. In various embodiments, the phase change material composition exhibits improved congruent melting as compared to a composition substantially free of the stabilizing matrix.

Non-limiting examples of suitable salt hydrates include lithium chlorate trihydrate ($LiClO_3.3H_2O$), dipotassium hydrogen phosphate hexahydrate ($K_2HPO_4.6H_2O$), potassium fluoride tetrahydrate ($KF.4H_2O$), manganese nitrate hexahydrate ($Mn(NO_3)_2.6H_2O$), calcium chloride hexahydrate ($CaCl_2.6H_2O$), sodium sulfate decahydrate ($Na_2SO_4.10H_2O$), sodium hydrogen phosphate dodecahydrate ($Na_2HPO_4.12H_2O$), zinc nitrate hexahydrate ($Zn(NO_3)_2.6H_2O$), iron (III) chloride hexahydrate ($FeCl_3.6H_2O$), calcium chloride tetrahydrate ($CaCl_2.4H_2O$), calcium nitrate tetrahydrate ($Ca(NO_3)_2.4H_2O$), sodium thiosulfate pentahydrate ($Na_2S_2O_3.5H_2O$), sodium acetate trihydrate ($C_2H_3NaO_2.3H_2O$), or combinations thereof. In certain embodiments, the salt hydrate comprises sodium sulfate decahydrate ($Na_2SO_4.10H_2O$), sodium acetate trihydrate ($C_2H_3NaO_2.3H_2O$), or a combination thereof.

The salt hydrate may be present in the phase change material composition in any amount suitable for the desired application. In various embodiments, the salt hydrate is present in an amount of from 1 to 99 wt. %, optionally from 50 to 99 wt. %, optionally from 75 to 99 wt. %, optionally from 90 to 99 wt. %, or optionally from 95 to 99 wt. %, based on a total weight of the phase change material composition.

Salt hydrates generally have well-defined discrete melting temperatures from the solid to liquid phase. The salt hydrate may have any melting temperature ($T_m$) suitable for the desired application. In certain embodiments, the salt hydrate has a melting temperature ($T_m$) of from 1° C. to 100° C., optionally from 5° C. to 80° C., or optionally from 5° C. to 60° C., as determined in accordance with ASTM E794, which is incorporated by reference herein in its entirety. Non-limiting examples of melting temperatures for a variety of salt hydrates are provided in Table 1 below.

TABLE 1

Non-limiting Examples of Salt Hydrate Melting Temperatures

| Name | $T_m$ (° C.) | Name | $T_m$ (° C.) |
|---|---|---|---|
| Lithium Chlorate Trihydrate | 8.0 to 8.1 | Zinc Nitrate Hexahydrate | 36 |
| Dipotassium Hydrogen Phosphate Hexahydrate | 13.3 to 14 | Iron (III) Chloride Hexahydrate | 36.1 |
| Potassium Fluoride Tetrahydrate | 18.7 | Calcium Chloride Tetrahydrate | 44.2 |
| Manganese Nitrate Hexahydrate | 25.0 | Calcium Nitrate Tetrahydrate | 43 |
| Calcium Chloride Hexahydrate | 24 to 30 | Sodium Thiosulfate Pentahydrate | 48 |
| Sodium Sulfate Decahydrate | 32.4 | Sodium Acetate Trihydrate | 58 |
| Sodium Hydrogen Phosphate Dodecahydrate | 35 to 36.5 | | |

TABLE 2

Non-limiting Examples of Salt Hydrate Energy Densities

| Name | Solid Density (g/cm$^3$) | Energy Storage Density (kWh/m$^3$) |
|---|---|---|
| Lithium Chlorate Trihydrate | 1.72 | 120.88 |
| Dipotassium Hydrogen Phosphate Hexahydrate | 1.75 | 52.82 ± 0.32 |
| Potassium Fluoride Tetrahydrate | 1.437 | 90.21 ± 10.16 |
| Manganese Nitrate Hexahydrate | 1.8 | 64.96 |
| Calcium Chloride Hexahydrate | 1.710 | 77.40 ± 10.90 |
| Sodium Sulfate Decahydrate | 1.485 | 101.75 ± 3.16 |
| Disodium Phosphate Dodecahydrate | 1.520 | 118.22 ± 0.42 |
| Zinc Nitrate Hexahydrate | 2.065 | 80.59 ± 3.73 |
| Iron (III) Chloride Hexahydrate | 1.82 | 104.18 ± 10.04 |
| Calcium Chloride Tetrahydrate | 1.5666 | 43.34 |
| Calcium Nitrate Tetrahydrate | 1.896 | 73.73 ± 1.05 |
| Sodium Thiosulfate Pentahydrate | 1.73 | 97.55 ± 2.88 |
| Sodium Acetate Trihydrate | 1.45 | 101.57 ± 14.84 |

In contrast, the transition temperature from liquid to solid is often less defined due to supercooling of the aqueous solution. In an extreme example, sodium acetate trihydrate ($C_2H_3NaO_2.3H_2O$) with a melting temperature of about 58° C. has been observed to supercool down to −12.7° C., which is nearly 71° C. below its melting temperature, before spontaneous crystallizing into its solid phase. In some embodiments, the phase change material composition further comprises a nucleating agent. Without being bound by theory, it is believed that the nucleating agent minimizes supercooling of the salt hydrate.

The nucleating agent may be any compound capable of initiating the crystallization process of the phase change material so long as the nucleating agent is compatible with the components of the phase change material composition. Non-limiting examples of suitable nucleating agents include tetraborate decahydrate ($Na_2B_4O_7.10H_2O$), sodium phosphate dibasic dodecahydrate ($Na_2HPO_4.12H_2O$), or a combination thereof. In various embodiments, the nucleating agent is selected from the group of sodium tetraborate decahydrate ($Na_2B_4O_7.10H_2O$), sodium phosphate dibasic dodecahydrate ($Na_2HPO_4.12H_2O$), and a combination thereof. In embodiments when the salt hydrate is sodium acetate trihydrate ($C_2H_3NaO_2.3H_2O$), the nucleating agent may comprise sodium phosphate dibasic dodecahydrate ($Na_2HPO_4.12H_2O$). In embodiments when the salt hydrate is sodium sulfate decahydrate ($Na_2SO_4.10H_2O$), the nucleating agent may comprise sodium tetraborate decahydrate ($Na_2B_4O_7.10H_2O$).

The nucleating agent may be present in the phase change material composition in any amount suitable for the desired application. In various embodiments, the nucleating agent is present in an amount of from 1 to 99 wt. %, optionally from 1 to 10 wt. %, or optionally from 1 to 5 wt. %, based on a total weight of the phase change material composition. The salt hydrate and the nucleating agent may be present in a weight ratio of from 1:50 to 50:1, optionally from 1:1 to 40:1, or optionally from 10:1 to 30:1.

The salt hydrate may have any energy density suitable for the desired application. In certain embodiments, the salt hydrate has an energy density in an amount of from 20 to 200 kWh/m$^3$, from 80 to 200 kWh/m$^3$, or optionally from 90 to 200 kWh/m$^3$, as determined in accordance with ASTM E793. Non-limiting examples of energy densities for a variety of salt hydrates are provided in Table 2 below.

Referring now to the stabilizing matrix, the stabilizing matrix comprises a polysaccharide selected from the group of a nanocellulose, a sulfonated polysaccharide, a starch, a glycogen, a chitin, and combinations thereof. Polysaccharides are long chains of carbohydrate molecules, specifically polymeric carbohydrates comprised of monosaccharide units bound together by glycosidic bonds. In various embodiments, the polysaccharide has a weight average molecular weight of at least 5,000 g/mol, optionally at least 10,000 g/mol, or optionally at least 50,000 g/mol.

The nanocellulose may comprise cellulose nanofiber, dextran functionalized carbon nanofiber, sulfonated cellulose nanofiber, or combinations thereof. In various embodiments, cellulose nanofibers are bundles of nanosized cellulose fibrils with high aspect ratio, which are held together by strong intermolecular and intramolecular hydrogen bonding. Without being bound by theory, it is believed that the entangled cellulose nanofiber networks physically trapped the salt solution when the salt hydrate is melted. The sulfonated polysaccharides may comprise dextran sulfate salt, sulfonated cellulose nanofiber, dextran functionalized carbon nanofiber, or combinations thereof. The starch may comprise amylopectin, amylose, or a combination thereof, such as those described in the article: Willfahrt, A., Steiner, E., Hötzel, J. et al. Printable acid-modified corn starch as non-toxic, disposable hydrogel-polymer electrolyte in supercapacitors. *Appl. Phys. A* 125, 474 (2019). https://doi.org/10.1007/s00339-019-2767-6 (see FIG. 1A), which is incorporated by reference herein in its entirety.

Figure 1B:
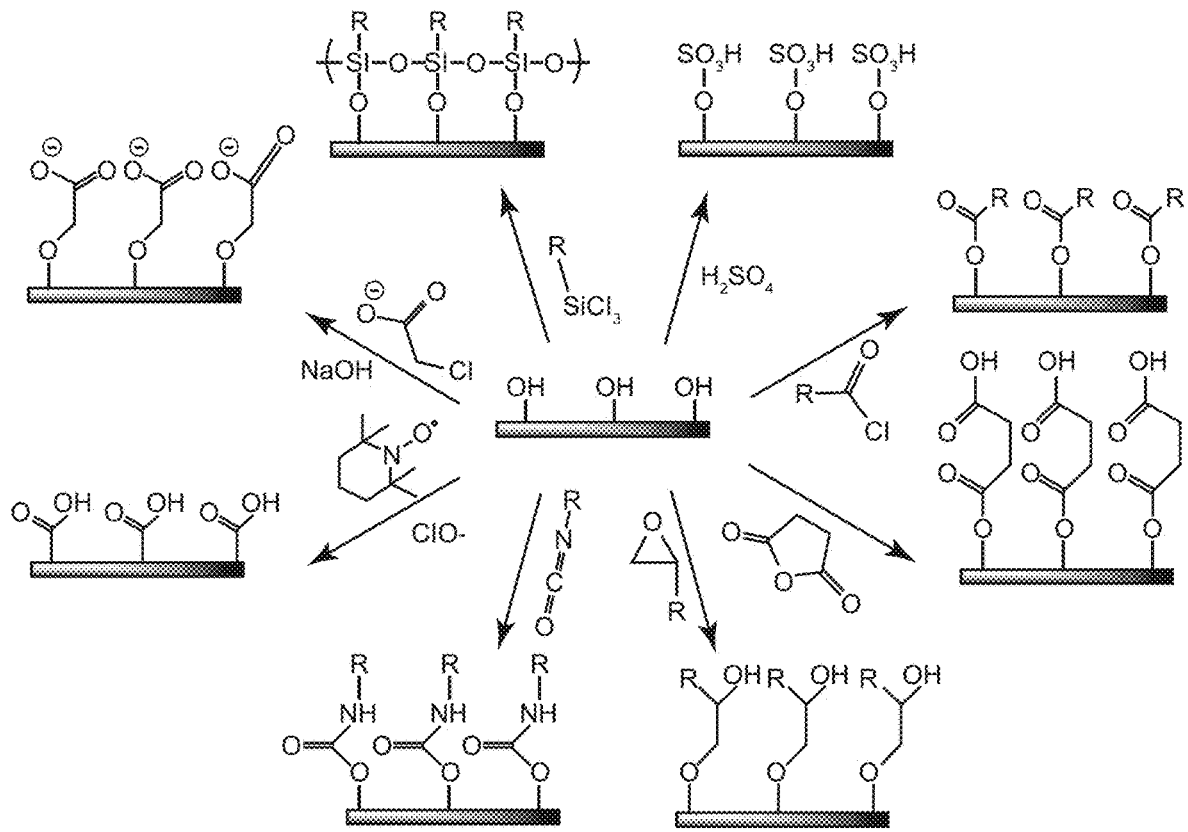

In certain embodiments, the stabilizing matrix comprises a modified polysaccharide. The modified polysaccharide comprises one or more of the functional groups, such as those shown in FIG. 1B and described in the article: Moon, Robert J.; Martini, Ashlie; Nairn, John; Simonsen, John; Youngblood, Jeff. 2011. Cellulose nanomaterials review: structure, properties and nanocomposites. *Chemical Society Reviews*. 40(7): 3941-3994, which is incorporated by reference herein in its entirety.

In certain embodiments, the stabilizing matrix comprises a nanocellulose, sulfonated polysaccharide, or a combination thereof. In some embodiments, the stabilizing matrix comprises nanocellulose and the salt hydrate may comprise sodium acetate trihydrate ($C_2H_3NaO_2.3H_2O$). In other embodiments, the stabilizing matrix comprises sulfonated polysaccharide and the salt hydrate may comprise sodium acetate trihydrate ($C_2H_3NaO_2.3H_2O$).

The stabilizing matrix may be present in the phase change material composition in any amount suitable for the desired application. In various embodiments, the stabilizing matrix is present in an amount of from 1 to 99 wt. %, optionally from 1 to 10 wt. %, or optionally from 1 to 5 wt., based on a total weight of the phase change material composition.

The phase change material composition may further comprise a thickener. The thickener may be any compound or material capable of increasing viscosity of the phase change material composition so long as the thickener is compatible with the components of the phase change material composition. Non-limiting examples of suitable thickeners include sodium polyacrylate, cellulose nanofiber, modified expanded graphite, or combinations thereof. It is to be appreciated that cellulose nanofiber may be effective as the stabilizing matrix or the thickener.

The thickener may be present in the phase change material composition in any amount suitable for the desired application. In various embodiments, the thickener is present in an amount of from 1 to 99 wt. %, optionally from 1 to 10 wt. %, or optionally from 1 to 5 wt. %, based on a total weight of the phase change material composition.

The phase change composition may further comprise a thermal conductivity enhancer. The thermal conductivity enhancer may be any compound or material capable of conducting heat within the phase change material composition so long as the thermal conductivity enhancer is compatible with the components of the phase change material composition. Non-limiting examples of suitable thermal conductivity enhancer include graphite flakes, carbon black, sulfonated reduced graphene oxide, or combinations thereof.

The thermal conductivity enhancer may be present in the phase change material composition in any amount suitable for the desired application. In various embodiments, the thermal conductivity enhancer is present in an amount of from 1 to 99 wt. %, optionally from 1 to 20 wt. %, or optionally from 1 to 10 wt. %, based on a total weight of the phase change material composition.

The phase change composition may further comprise one or more additives depending on at least the anionic and cationic properties of the salt hydrate utilized. Non-limiting examples of suitable additives can be found in Table 3 below.

TABLE 3

Non-limiting Examples of Additives

| Name | Strength of Functional Group |
| --- | --- |
| acrylamide | Weak cation |
| N-[3-(dimethylamino) propyl] acrylamide | Weak cation |
| 2-(dimethylamino)ethyl methacrylate | Weak cation |
| 2-(diethylamino)ethyl methacrylate | Weak cation |
| [2-(methacryloyloxy) ethyl] trimethylammonium chloride | Strong cation |
| 2-(acryloyloxy ethyl) trimethylammonium chloride | Strong cation |
| [3-(methacryloylamino) propyl] trimethylammonium chloride | Strong cation |
| 2-carboxyethyl acrylate | Weak anion |
| methacrylic acid | Weak anion |
| acrylic acid | Weak anion |
| itaconic acid | Weak anion |
| 3-sulfopropyl methacrylate potassium salt | Strong anion |
| 2-sulfoethyl methacrylate | Strong anion |

The one or more additives may be present in the phase change material composition in any amount suitable for the desired application. In various embodiments, the one or more additives are present in an amount of from 1 to 99 wt. %, optionally from 1 to 10 wt. %, or optionally from 1 to 5 wt. %, based on a total weight of the phase change material composition.

In one exemplary embodiment, the phase change material composition comprises the salt hydrate, the stabilizing matrix, the thickener, and the thermal conductivity enhancer. In this exemplary embodiment, the salt hydrate comprises sodium sulfate decahydrate; the stabilizing matrix comprises dextran sulfate sodium salt; the thickener comprises sodium polyacrylate, cellulose nanofiber or a combination thereof; and the thermal conductivity enhancer comprises graphite flakes, carbon black, or a combination thereof.

In another exemplary embodiment, the phase change material composition comprises the salt hydrate, the stabilizing matrix, and the thermal conductivity enhancer. In this exemplary embodiment, the salt hydrate comprises sodium sulfate decahydrate; the stabilizing matrix comprises cellulose nanofiber; and the thermal conductivity enhancer comprises sulfonated reduced graphene oxide.

In another exemplary embodiment, the phase change material composition comprises the salt hydrate and the stabilizing matrix. In this exemplary embodiment, the salt hydrate comprises sodium sulfate decahydrate; and the stabilizing matrix comprises dextran sulfate sodium salt.

In another exemplary embodiment, the phase change material composition comprises the salt hydrate, the stabilizing matrix, and the thermal conductivity enhancer. In this exemplary embodiment, the salt hydrate comprises sodium sulfate decahydrate; and the stabilizing matrix comprises sulfonated cellulose nanofiber and the thermal conductivity enhancer comprises graphite flakes, carbon black, or a combination thereof.

As introduced above, a composite material is also provided. The composite material is adapted to be in the presence of an energy source with the energy source adapted to provide heat. Non-limiting examples of suitable energy sources include natural environments surrounding the composite material, components for a refrigeration device, components for a HVAC system, bodies of humans and animals, electronics, batteries, solar photovoltaics, and the like.

The composite material comprises a support adapted to be in thermal communication with the energy source. The composite material further comprises the phase change material composition with the phase change material composition disposed within the support. Non-limiting examples of suitable supports include cases, textiles, mattresses, insulation boards, or any other physical support that can contain the phase change material composition.

The heat generated by the energy source has a temperature greater than the melting temperature of the phase change material. As a result, the salt hydrate of the phase change material composition undergoes a phase transition from solid to liquid resulting in the absorption of the heat. Heat may then be released when the temperature of the phase change material composition decreases to the freezing point of the salt hydrate.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

EXAMPLES

Example 1: Cellulose Nanofiber (CNF) as a Novel Matrix for Salt Hydrate PCMs that are Strong Hydrogen Bonding Acceptors, Such as SAT This example shows a viable solution for preventing phase separation in SAT using CNF. CNFs are bundles of nanosized cellulose fibrils with high aspect ratio, which are held together by strong intermolecular and intramolecular hydrogen bonding. CNF is usually produced in water medium and the final aqueous CNF suspension contains over 90 wt % of water. FIG. 2A shows the picture of an aqueous CNF suspension with 3 wt % of CNF. Inspired by the strong water absorption rate of CNF, we investigated the potential use of CNF as a novel matrix for salt hydrate PCMs. Sodium sulfate decahydrate ($Na_2SO_4.10H_2O$, SSD) and sodium acetate trihydrate ($CH_3COONa.3H_2O$, SAT) were used as the PCMs. Sodium tetraborate decahydrate ($Na_2B_4O_7.10H_2O$, Borax) and sodium phosphate dibasic dodecahydrate ($Na_2HPO_4.12H_2O$, SPDD) were used as a nucleating agent (to minimize supercooling) for SSD and SAT, respectively. The weight ratio of PCM, CNF, and nucleator was 100:4:5. FIGS. 2B and 2C show pictures of the PCM composites in their molten state. When the glass vial was tilted, no flow of the composites was observed, indicating an excellent thickening effect of the CNF. The CNF effectively forms a nano-scale porous network of fibrils that contains the liquid material in a manner analogous to a sponge. It was thought that the entangled CNF networks physically trapped the salt solution when the PCM is melted.

The thermal cycling stability of the prepared PCM composites were characterized using differential scanning calorimetry (DSC). FIGS. 3A and 3B show the original DSC curves of the PCM composites under thermal cycling. The melting peak of SSD/CNF/Borax showed a gradual shift to the upper left as indicated by the arrow in FIG. 3A, suggesting a reduction of energy storage capacity, whereas in the case of SAT no significant change of the melting peak was observed.

The melting enthalpies of the composites were calculated by integrating the peak area and the results are shown in FIG. 4A, in agreement with the original DSC curves. The high thermal cycling stability and energy storage capacity of the SAT/CNF/SPDD was attributed to the hydrogen bonding between sodium acetate and the hydroxyl groups on CNF (FIG. 4B) as previous research has shown that acetate is a good hydrogen bonding acceptor. This chemical interaction is believed to contribute to the excellent performance of the SAT based PCM composite.

Figures 5A, 5B:
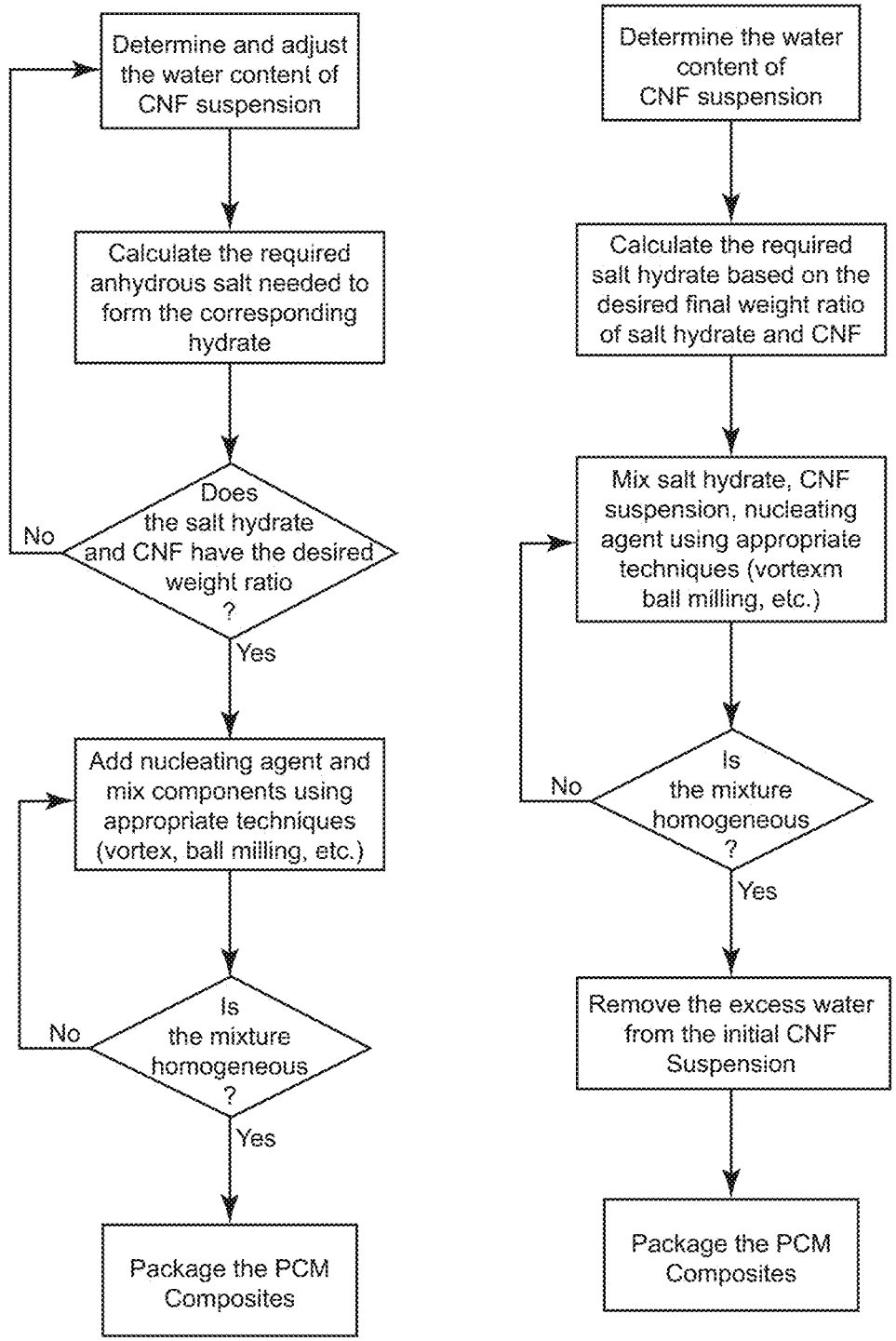

Taking advantage of the high water content, the aqueous CNF suspension can be directly used to fabricate salt hydrate PCM composites. FIGS. 5A and 5B show simplified flow diagrams for the preparation of PCM composites. Depending on the type of the salt hydrate, the PCM composites can be prepared either by directly adding anhydrous salt into the aqueous CNF suspension (FIG. 5A) or by adding salt hydrate into the CNF suspension followed by evaporating the excess water (FIG. 5B). The first method requires the least effort of processing, showing great potential to reduce the manufacturing cost of the PCM composites. Moreover, the starting materials (aqueous CNF suspension and anhydrous salt) are already in mass production, making this method highly scalable. For anhydrous salts that are highly exothermic when mixed with water, the mixing process may be controlled with a cooling device. If not controllable, the second method can be used, which requires more energy input to evaporate water, but the excess water in the system can facilitate the mixing process.

Example 2: Dextran Sulfate Sodium Salt (DSS) as a Stabilizing Matrix for Sodium Sulfate Decahydrate (SSD)

This example shows a successful solution for sodium sulfate decahydrate (SSD), one of the lowest-cost and highest-energy density salt hydrates, with traditionally has one of the most challenging incongruency problems.

Figure 6A:
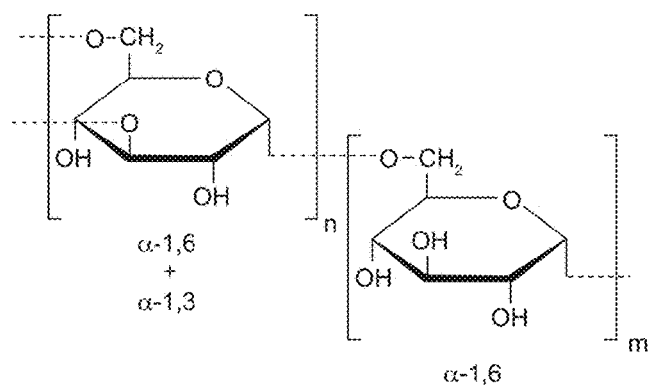
Figure 6B:
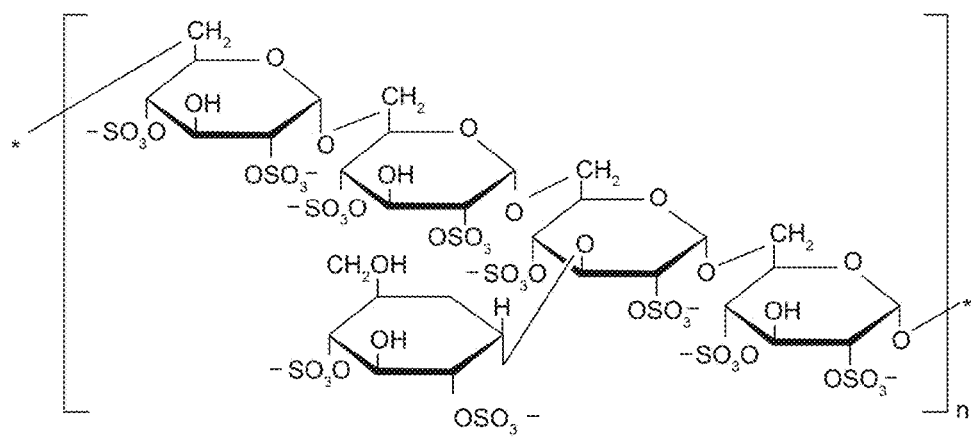

It was shown in the previous example that the thermal cycling stability of the salt hydrate can be improved by introducing desired chemical interactions between the salt hydrate ions and the matrix material. Compared to acetate, the sulfate group from SSD is more chemically inert and cannot form hydrogen bonding with CNF, which resulted in a low thermal cycling stability observed for the SSD/CNF/Borax composite (FIG. 4A). To solve this problem, we used a modified polysaccharide matrix for SSD, known as dextran sulfate sodium salt (DSS). DSS is a sulfonated dextran (polysaccharide derived from the condensation of glucose) with sulfate ions directly attached to the polymer chains. When DSS is dissolved in an aqueous solution, the sodium dissociates from the polymer chain, resulting in a negatively charged polyanion. The chemical structures of dextran and DSS polyanion are shown in FIGS. 6A and 6B, respectively.

Figure 6C:
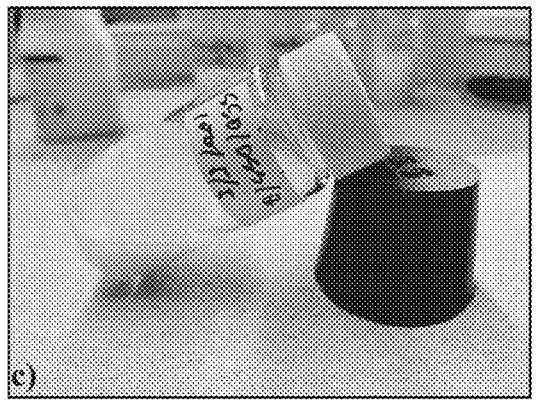
Figure 6D:
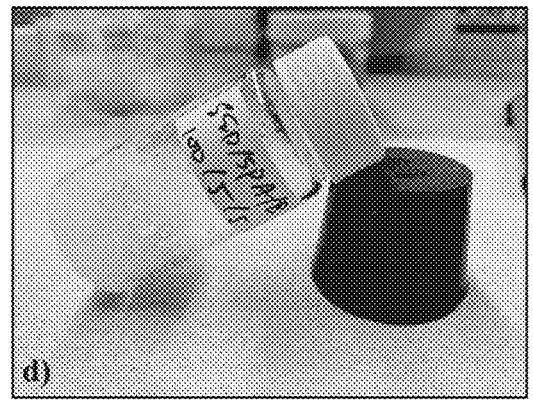
Figure 7A:
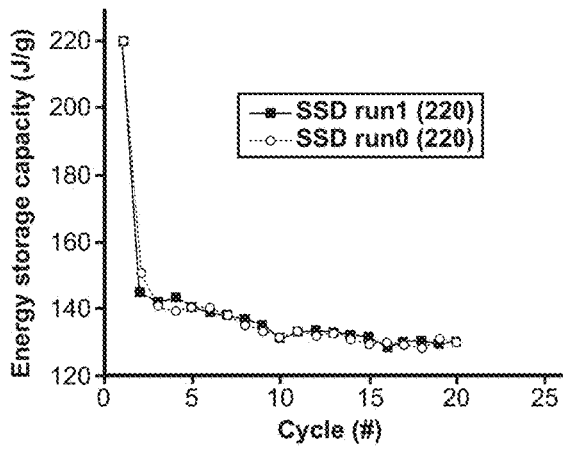
Figure 7B:
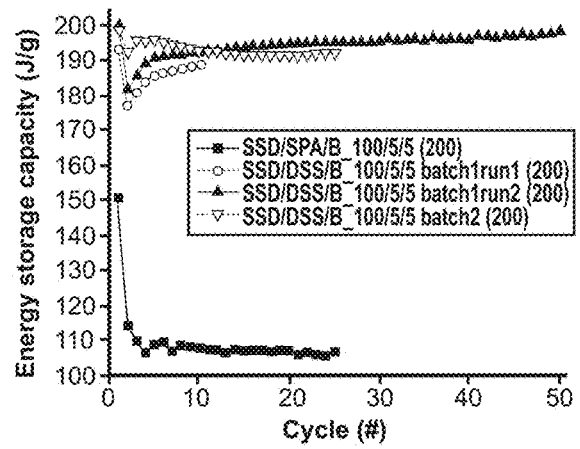

Interestingly, the use of DSS did not show any physical thickening effect, as shown in FIG. 6C. However, the prepared PCM composite, SSD/DSS/Borax exhibited outstanding energy storage capacity and thermal cycling stability. FIGS. 7A and 7B compare the change of energy storage capacity of several prepared PCM samples over multiple melting-freezing cycles. Pure SSD showed an initial stored energy of 220 J/g in the first heating scan. Then, the stored energy reduced to 145 J/g in the second heat scan because of phase separation (FIG. 7A). The addition of traditional thickeners, such as SPA, increased viscosity of the PCM composites (but did not prevent the reduction of energy storage capacity upon thermal cycling (FIG. 7B, black line). In contrast, the addition of DSS resulted in a PCM composite with high energy storage capacity and stability, as shown in the upper 3 curves of FIG. 7B.

The phase change material composition exhibits dramatically improved cyclical energy storage stability of SSD with DSS and borax, with a slightly increasing energy storage trend after 50 thermal cycles. The upward trend in energy storage with repeated cycling suggests that we have created an inherently stable composite, so that with each cycle the hydrate tends towards a more stable configuration.

Example 3: Cellulose Nanofiber (CNF) and Dextran Sulfate Sodium Salt (DSS) as a Stabilizing Matrix for Sodium Sulfate Decahydrate (SSD)

Figure 8A:
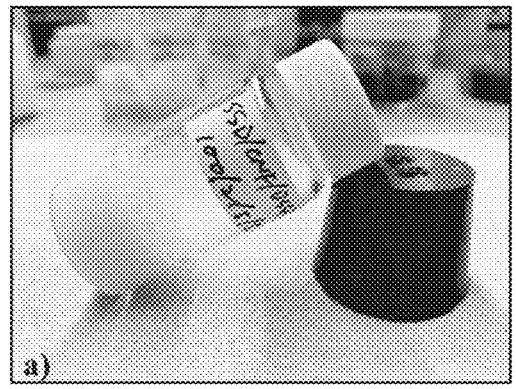
Figure 8B:
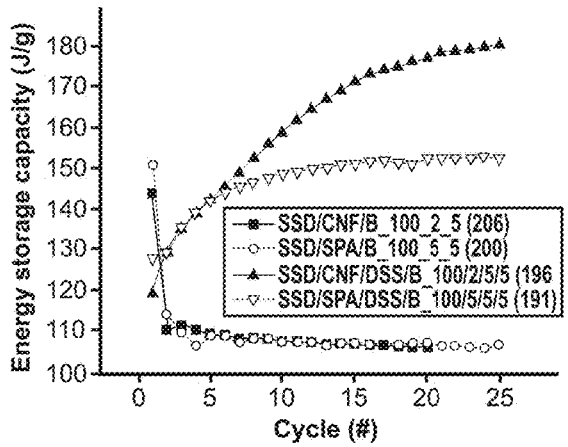
Figure 8C:
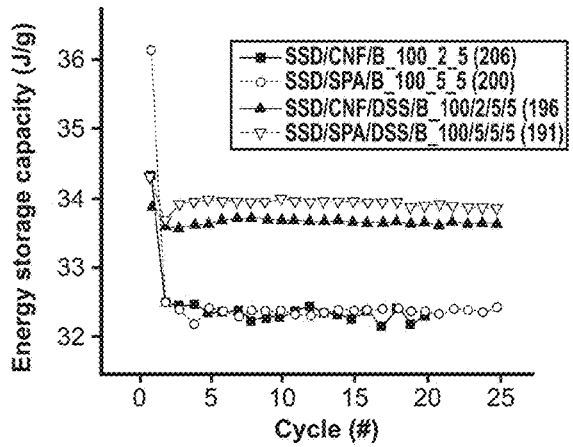

The ability of salt hydrate PCMs to maintain shapes upon melting and freezing is equally important to thermal cycling stability and energy storage capacity, as liquid leakage may happen due to low viscosity of the molten salt hydrates. We developed a method to solve this issue by using both CNF and DSS as a composite matrix. This example shows the use of this novel composite matrix with SSD for the preparation of form-stable PCMs with high thermal cycling stability and high energy storage capacity. In this composite, CNF physically thickens the ionic solution of the molten sodium sulfate to achieve shape stability, and DSS chemically stabilize the ions to achieve thermal cycling stability. FIG. 8A shows a photo of the prepared PCM composite taken in its molten state. No flow of the material was observed, indicating the effectiveness of using CNF as a physical thickener. FIG. 8B shows the thermal cycling results of the novel PCM composites and two control samples prepared without using DSS. It is worth mentioning that the samples containing DSS showed higher melting temperatures than pure SSD (32.4° C.) (see FIG. 8C). It is not clear what caused this behavior, but it provides an interesting approach for tuning phase transition of salt hydrate-based PCMs, which can facilitate practical application of the PCMs.

Figure 9A:
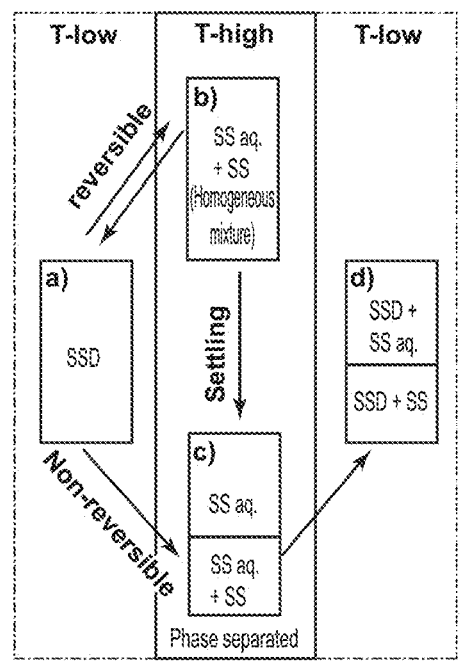
Figure 9B:
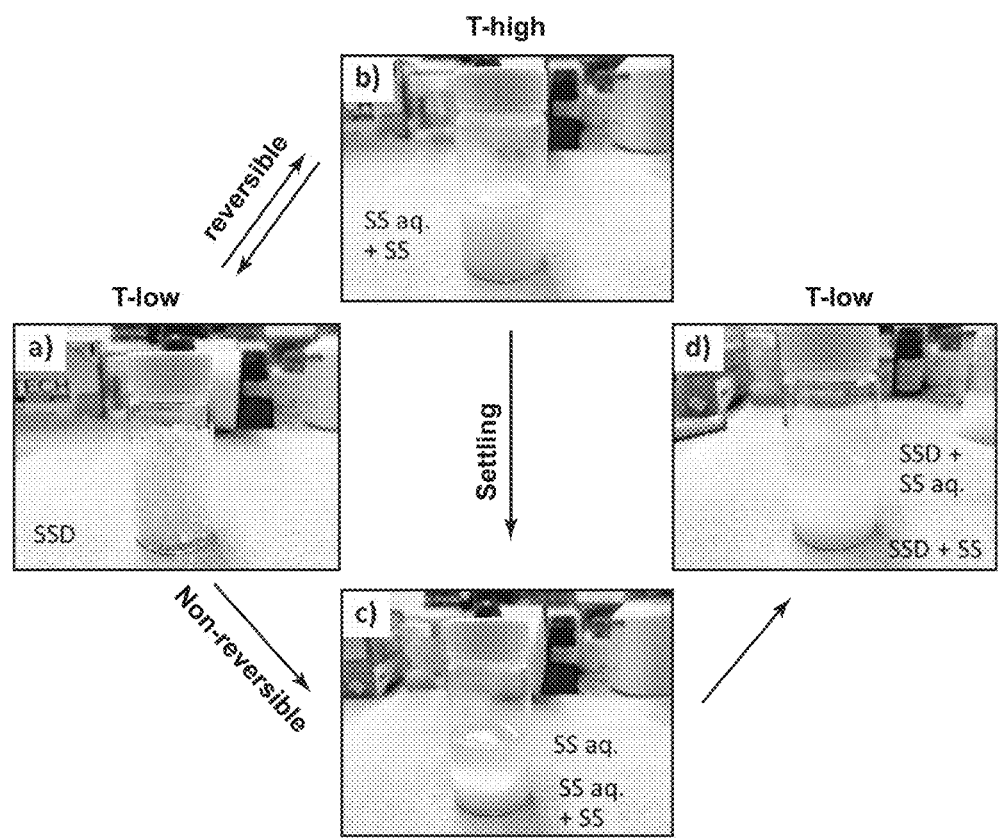

Example 4: Phase Separation of Sodium Sulfate Decahydrate (SSD) Without a Stabilizing Matrix It is known that SSD suffers from severe phase separation upon thermal cycling. FIGS. 9A and 9B show a schematic illustration of the phase transition and phase separation processes involved in the thermal cycling of SSD. Generally, the melting of SSD results in the formation of sodium sulfate (SS) particles and a saturated SS aqueous solution. If no gravity is considered, the mixture will remain homogeneous with SS particles evenly distributed in the SS aqueous solution (process a to b). This process is considered to be reversible, meaning when cooled, all the SS particles will be rehydrated to form SSD. In other words, the homogeneity keeps the local weight concentration of SS at 44.1 wt % across the mixture, thus leading to a full conversion to SSD. In reality, however, the formed SS particles tend to settle due to their high density compared to the SS aqueous solution, leading to a phase separated mixture (process b to c).

Upon cooling the phase separated mixture (process c to d), the top SS aqueous solution is partially covered to SSD because the concentration of SS is lower than 44.1 wt %. Similarly, the bottom SS particles and the SS aqueous solution in the spacing of the particles are partially covered to SSD because the concentration of SS is higher than 44.1 wt %. This partial conversion to SSD causes a reduction of energy storage capacity. Repeated heating and cooling lead to a further deviation of the SS concentration of the top and bottom layers from the stoichiometric value and lead to continuous reduction of energy storage capacity.

Figure 10:
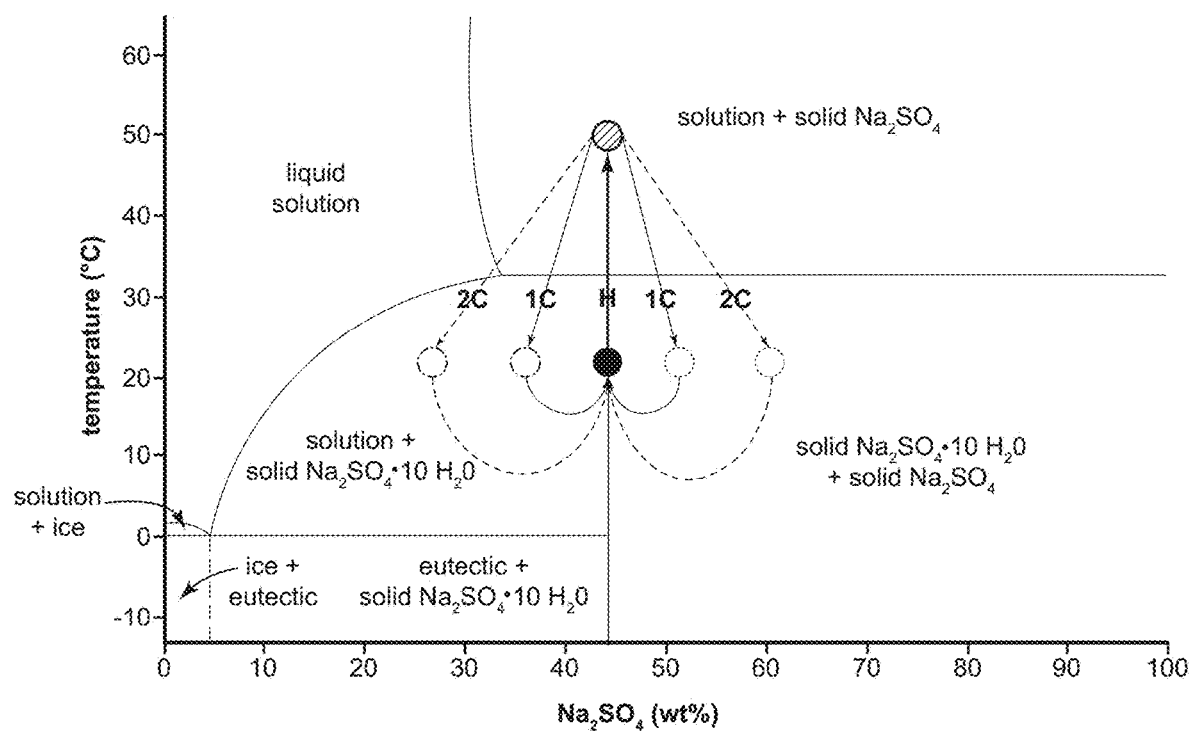

This is illustrated in the phase diagram of SSD in FIG. 10, where the initial SSD (represented by a black dot) is converted to SS and SS aqueous solution (blue dot) upon melting. After phase separation, the cooling process results in two phases with SS concentrations lower (yellow dot) and higher (green dot) than 44.1 wt %. The second thermal cycling process (labeled as H and 2C) not only produces additional SS particles that will settle down but also causes fusion of the SS particles formed previously, leading to a further decease of SS concentration of the top layer and increase of the bottom layer.

Example 5: Effect of Dextran Sulfate Sodium Salt (DSS) on Suspending Sodium Sulfate (SS) Particles Dramatically improved cyclical energy storage stability of SSD with DSS and Borax (to minimize supercooling) was described above. Here, we further investigate the effect of DSS. Three samples containing different weight ratios of SSD and DSS were prepared and were labeled as SSD, SSD/DSS_100/0.5, and SSD/DSS_100/5. Borax was not used to avoid any potential stabilizing effect on SSD. The samples were melted in a heated sonication bath and then shook vigorously to produce a homogenous mixture. The optical appearance of the samples immediately after mixing is shown in FIG. 11A. Interestingly, the samples modified with DSS (2 and 3) remained homogenous after the agitation was stopped for 3 minutes, whereas the neat SSD sample quickly phase separated under the same condition (FIG. 11B). Thermal energy storage capacity and stability of the samples were characterized using differential scanning calorimetry (DSC). DSC samples were prepared using the homogenous mixtures shown in FIG. 3a.

As shown in FIG. 11C, neat SSD sample showed a gradual decrease of energy storage capacity caused by the phase separation discussed previously. In contrast, the samples with DSS (0.5 wt. % and 5 wt. %) showed high thermal energy storage capacity and stability. This was attributed to a reduced settling rate of the SS particles, which improvs sample homogeneity and allows the local SS concentration to be close to the stoichiometric value (44.1 wt %). Therefore, upon cooling the floating SS particles can be converted to SSD, mimicking the reversible process of a-b depicted in FIGS. 9A and 9B. However, it is worth mentioning that phase separation behavior is usually reduced in DSC experiments due to the small sample size. Therefore, it is necessary to investigate the phenomenon at a larger scale.

Figure 12A:
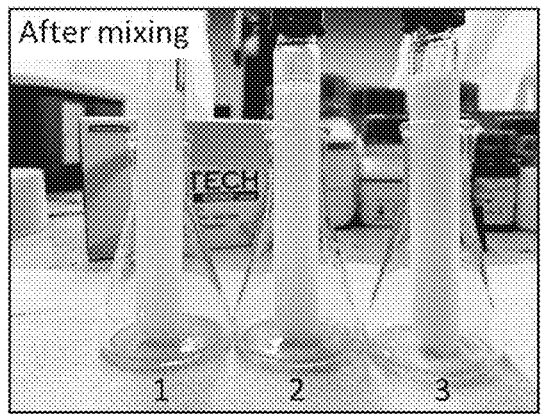
Figure 12B:
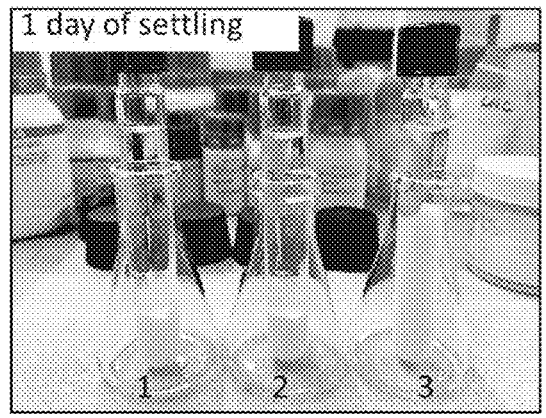

Example 6: Effect of Dextran Sulfate Sodium Salt (DSS) on Suspending Sodium Sulfate (SS) Particles During Scale-Up In order to investigate the effect of DSS on SS particles at a larger scale, homogenous mixtures of SSD and DSS with different weight ratios were poured into glass tubes (13*100 mm), and were kept in an oven at 60° C. for 1 day to evaluate the degree of settling of SS particles. When tested at a larger scale, the settling of SS particles was observed for all the investigated compositions, as shown in FIGS. 12A and 12B. It was found that increasing the concentration of DSS reduced the settling rate of SS particles.

Figure 13A:
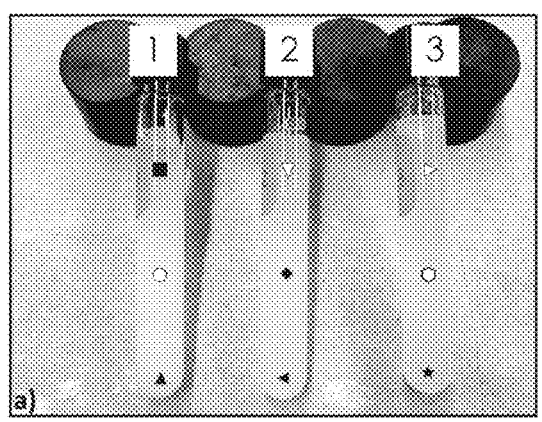
Figure 13B:
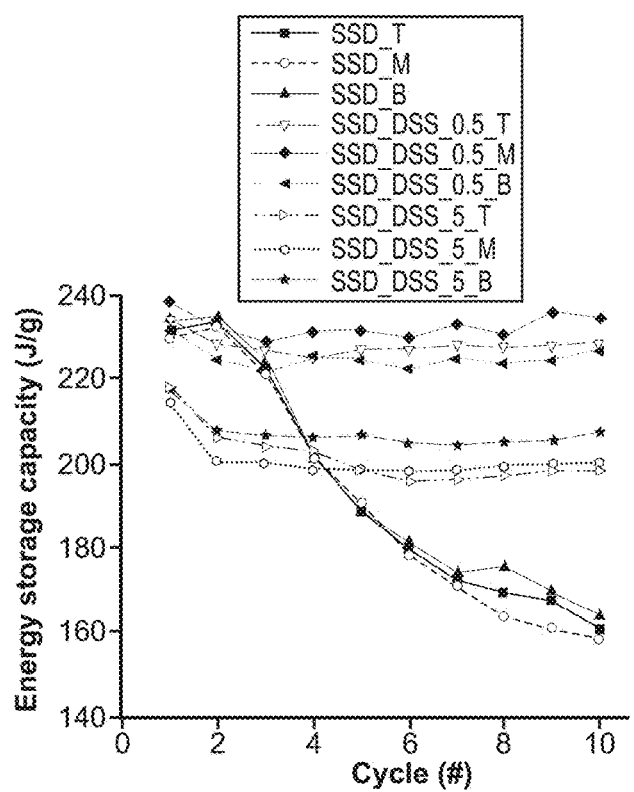

Thermal energy storage capacity and stability of the samples before and after settling of the SS particles were characterized using DSC. FIG. 13A shows samples that were frozen before the SS particles settled down. These samples were prepared by immediate cooling of the homogeneous mixtures in an ice bath. To evaluate sample homogeneity, DSC cycling tests were performed on the materials collected at different heights, as indicated by the color symbols in FIG. 13A. As can be seen in FIG. 13B, for each composition, the materials sampled from different heights exhibited almost the same thermal cycling behavior, indicating that the mixture remained homogeneous during the cooling process. However, the energy storage capacity and stability of the samples with and without DSS showed a significant difference. It is noteworthy that high energy storage capacities were observed for neat the SSD sample in the first two cycles, suggesting a reversible conversion between SSD and SS particles, as shown in the process of a to b in FIGS. 9A and 9B. Once SS particles started to settle, incomplete conversion began, leading to a continuous reduction of energy storage capacity.

Figure 15A:
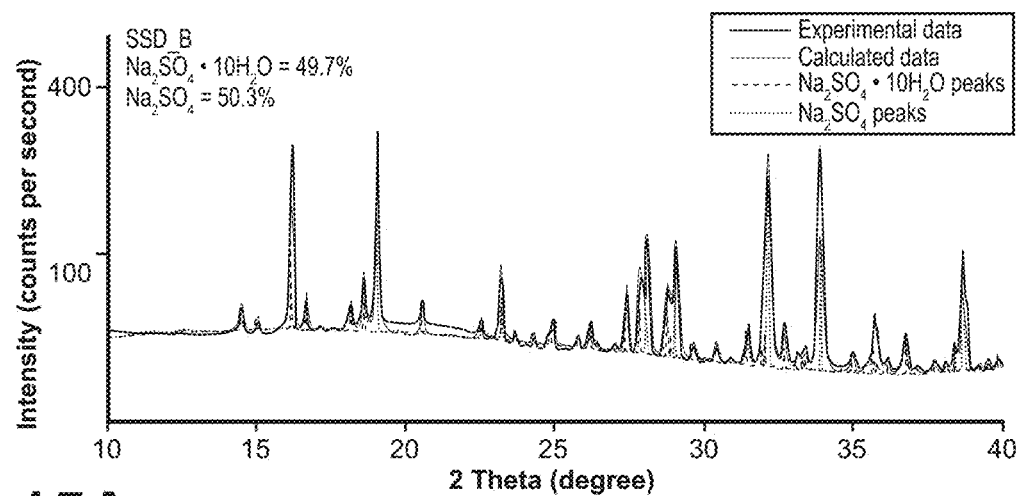
Figure 15B:
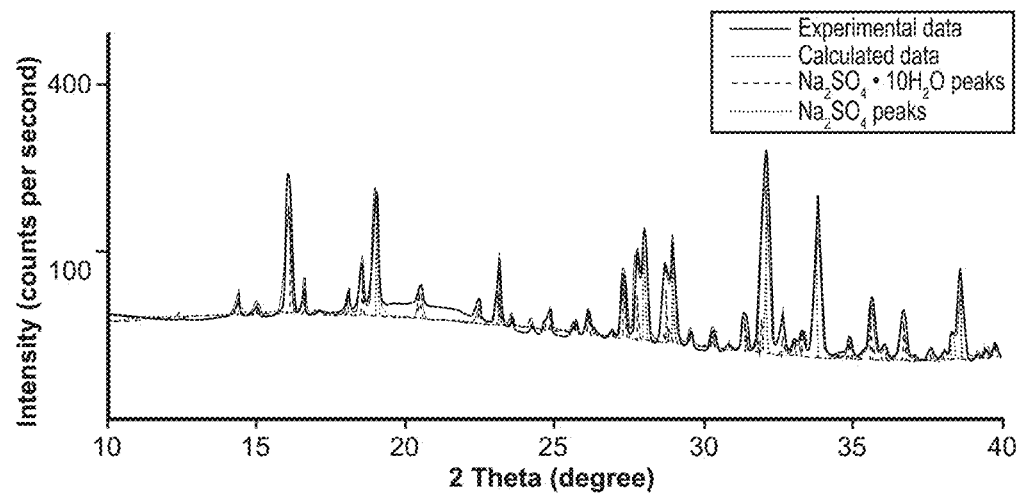
Figure 15C:
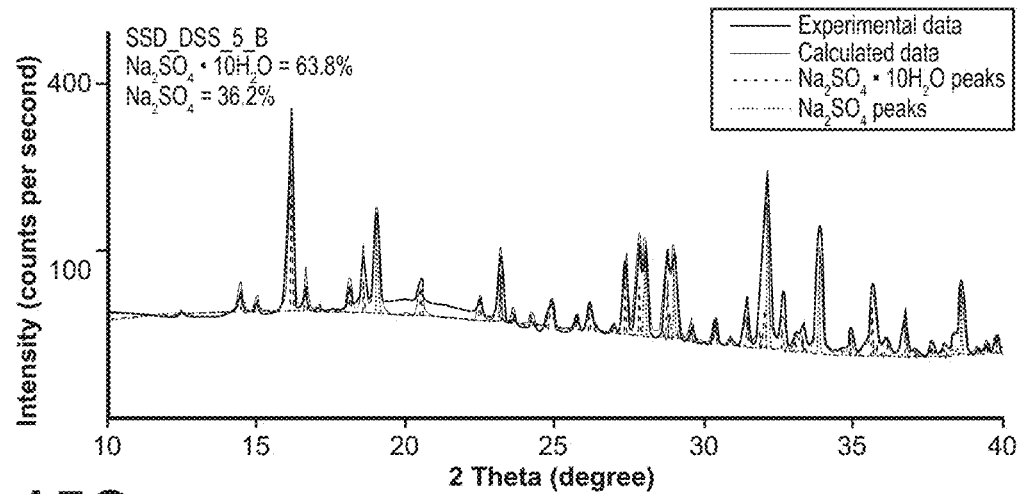

FIG. 14A shows samples that were frozen after SS particles settled, in which two separated phases were observed for all the samples. FIGS. 14B and 14C show DSC cycling results of the materials collected from top and bottom of the glass tube for each composition. Generally, the samples modified with DSS showed higher energy storage capacity than neat SSD regardless of the position of the materials. This can be explained by the degree of deviation of the local SS weight concentration from the stoichiometric value (44.1 wt %). For example, although all the prepared samples showed settling of SS particles on the bottom, the degree of compactness of the SS particles and the resulting SS weight concentration were different. To confirmed this, we performed X-ray scattering diffraction (XRD) experiments on the materials collected from the bottom of each composition in the frozen state, which allows for the calculation of weight ratios of SSD to SS using Rietveld analysis. Representative XRD scans are shown in FIGS. 15A, 15B, and 15C and the calculated ratios are summarized in Table 4. It was found that the samples modified with DSS (0.5 wt. % and 5 wt. %) showed lower SS concentration and higher SSD concentration on the bottom. By using a theoretical latent heat value of 220 J/g for pure SSD, we calculated the energy storage capacity of the materials, which showed the same increasing trend (SSD<SSD/DSS_100/0.5<SSD/DSS_100/5) as observed in the DSC experiments. The difference in the values might be caused by experiment uncertainties and is under further investigation.

Table 4 provides the calculated weight concentrations of SSD and SS using Rietveld analysis and a comparison between the calculated energy storage capacity from XRD and measured energy storage capacity from DSC experiments.

TABLE 4

|  | SSD (wt %) | SS (wt %) | Calculated energy storage capacity (J/g) | Measured energy storage capacity (J/g) |
|---|---|---|---|---|
| SSD_B | 49.7 | 50.3 | 109.3 | 118.2 |
| SSD_DSS_100/0.5_B | 51.2 | 48.8 | 112.6 | 138.7 |
| SSD_DSS_100/5_B | 63.8 | 36.2 | 140.4 | 153.2 |

Figure 16A:
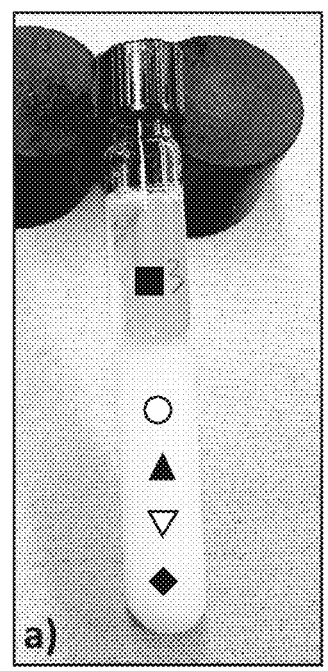
Figure 16B:
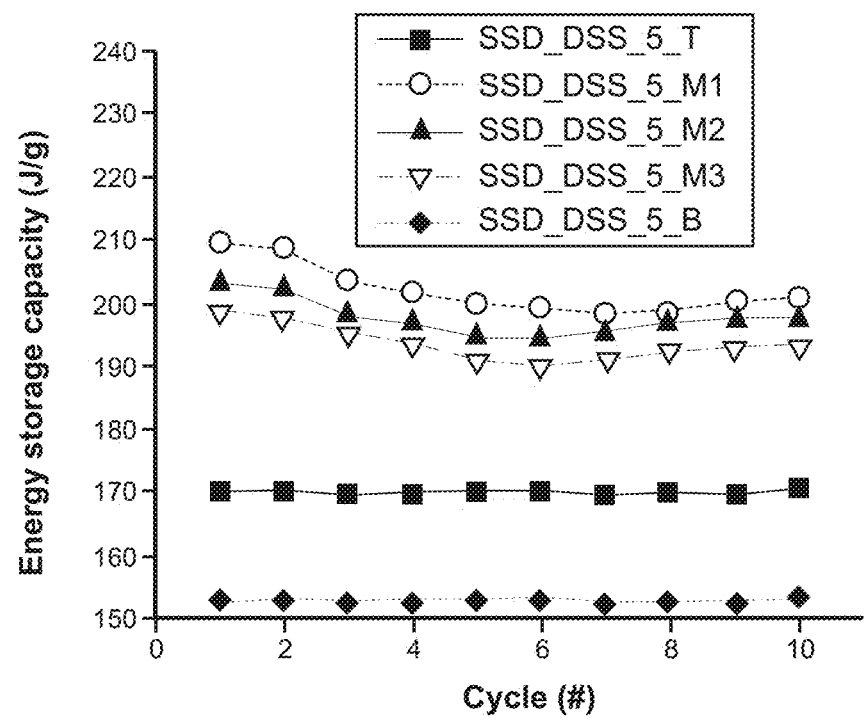

For sample SSD_DSS_100/5, additional DSC and XRD measurements were made on the materials collected at different heights, as shown in FIG. 16A. FIG. 16B shows the DSC cyclingresults of the collected materials. A correlation between energy storage capacity and the position of the materials collected was observed. The materials collected from the very top and very bottom (black and purple symbols) of the tube showed significant less energy storage capacity compared to the materials collected from the middle area (red, blue, and green symbols). Again, this was related to the degree of deviation of the local SS weight concentration from the stoichiometric value (44.1 wt %). For the materials from the middle region (M1, M2, and M3), the energy storage capacity decreased as the collecting positions moved to the bottom of the tube. This was confirmed by the decrease of SSD and increase of SS concentration determined from XRD Rietveld analysis, as shown in Table 5. These results indicated that the use of DSS mitigated the phase separation of SSD by reducing settling rate of the SS particles. The stabilizing mechanism is discussed below.

Table 5 provides the calculated weight concentrations of SSD and SS using Rietveld analysis of SSD/DSS_100/5 and a comparison between the calculated energy storage capacity from XRD and measured energy storage capacity from DSC experiments.

TABLE 5

|  | SSD (wt %) | SS (wt %) | Calculated energy storage capacity (J/g) | Measured energy storage capacity (J/g) |
|---|---|---|---|---|
| SSD_DSS_100/5_M1 | 94.2 | 5.8 | 207.2 | 200.8 |
| SSD_DSS_100/5_M2 | 88.9 | 11.1 | 195.6 | 197.6 |
| SSD_DSS_100/5_M3 | 87.5 | 12.5 | 192.5 | 193.2 |

Figure 17A:
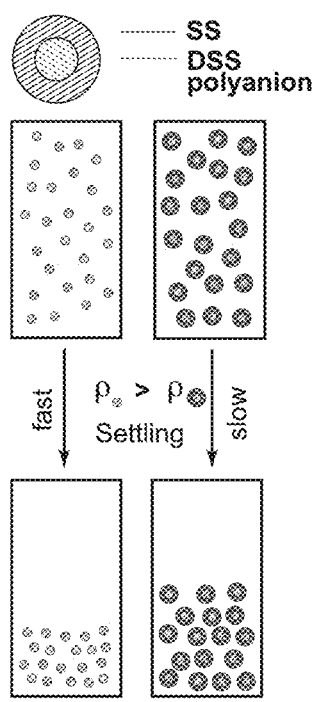

Example 7: Proposed Stabilizing Mechanism and Strategies for Improving Performance Based on our experimental results, here we propose a mechanism detailing the effect of DSS on improving energy storage stability and capacity of SSD upon thermal cycling (FIG. 17A). When DSS is dissolved in a SS aqueous solution, the sodium dissociates from the polymer salt, leaving negatively charged polymer chains. The DSS polyanions interact with the SS particles through electrostatic interactions, resulting in composite particles with a SS core and a DSS shell. Compared to pure SS particles, the composites particles have a slower settling rate because of their lower densities, thereby reducing the phase separation of SS particles and SS solution. Since the DSS shell is permeable to water, rehydration of the SS particles during the cooling process is not affected. In addition, the composite particles are negatively charged because of the DSS shell, which prevents fusion of the SS particles, further improving thermal cycling stability of SSD.

Figure 17B:
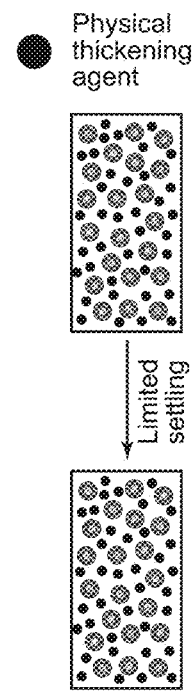
Figure 17C:
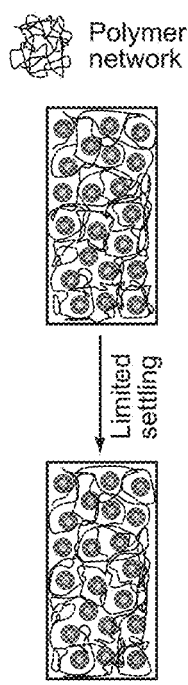
Figure 17D:
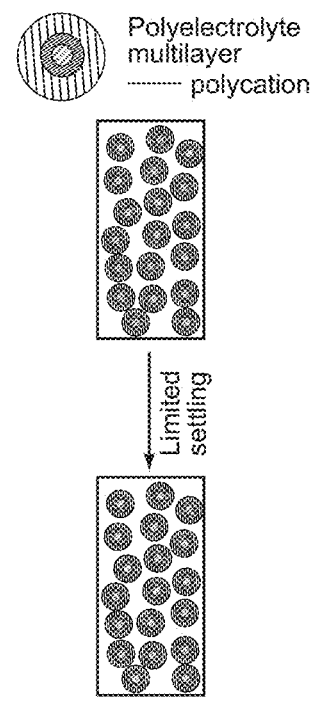
Figure 18:
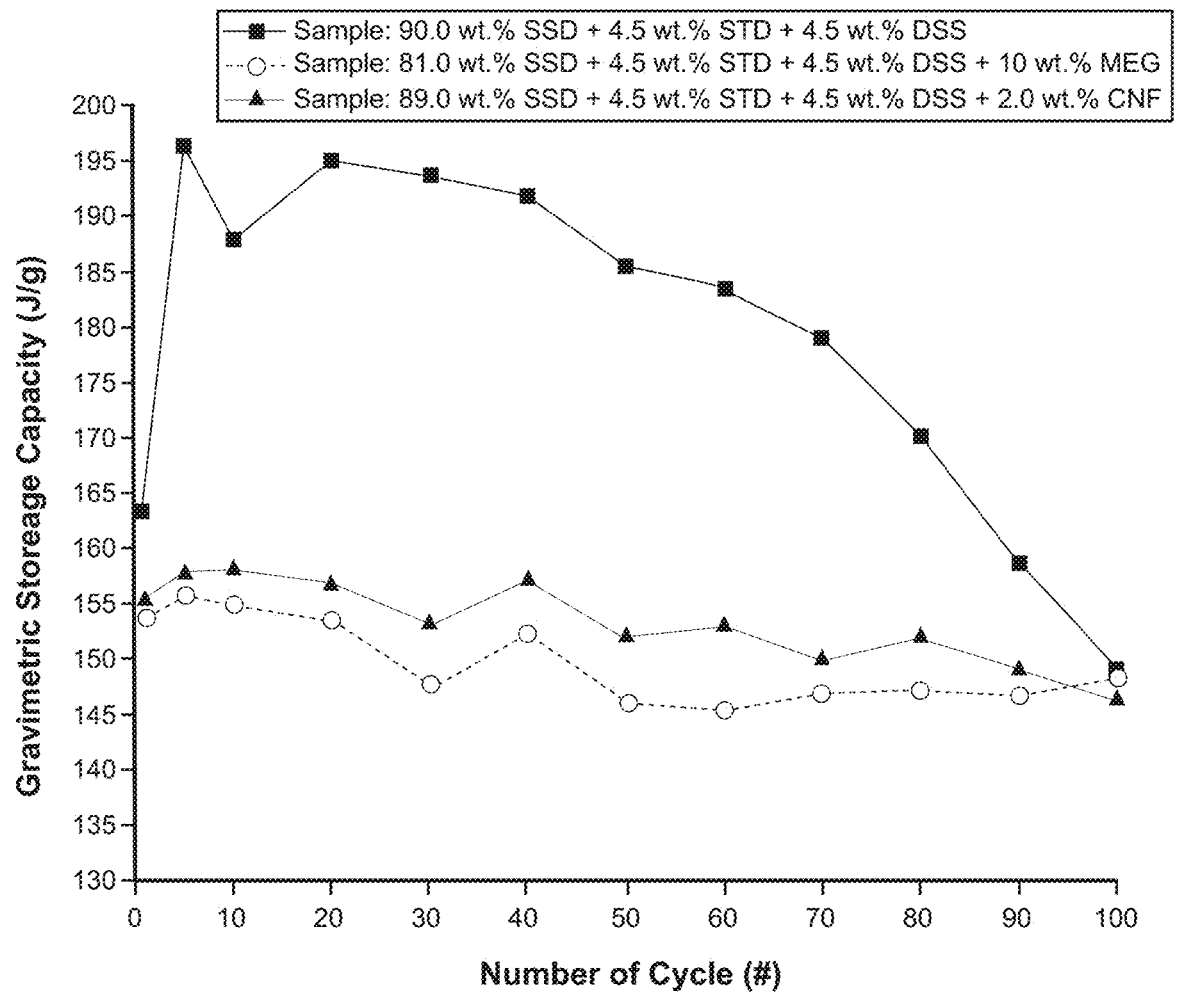

However, the use of DSS cannot eliminate phase separation. As shown previously, the composites particles sunk after 1 day of settling. To solve this problem, we developed a few strategies, schematically illustrated in FIGS. 17B, 17C, and 17D. The incorporation of physical thickening agent, such as modified expanded graphite (MEG) and cellulose nanofiber (CNF) is proven to be effective. FIG. 18 shows thermal cycling performance of SSD samples modified by DSS, DSS with MEG, and DSS with CNF. Detailed compositions are summarized in Table 6. The prepared samples were evaluated over 100 thermal cycles between 15° C. and 41° C. in a Temperature-History setup (T-History). The addition of MEG or CNF significantly improved energy storage stability of the composites because of the thickening effect. In the case of MEG, the porous structure trapped the composite particles of SS and DSS, while in the case of CNF, they were trapped by the crosslinking networks. Another potential strategy involved the fabrication of polyelectrolyte multilayers on the SS particles to further reduce density of the composite particles. For example, the DSS modified SS particles are negatively charged, and therefore a new layer can be formed by passing the particles through a polycation solution, such as poly(allylammine) or poly(diallyldimethylammonium chloride). Then another new layer can be formed by passing through a polyanion solution, such as poly(styrene sulfonate) or poly(vinylsulfonate).

Table 6 provides the compositions of different samples evaluated from long-term cyclic stability.

TABLE 6

| Sample | SSD (wt %) | DSS (wt %) | Sodium tetraborate decahydrate (STB) (wt %) | Modified expanded graphite (MEG) (wt %) | Cellulose Nanofiber (CNF) (wt %) |
|---|---|---|---|---|---|
| 1 | 91 | 4.5 | 4.5 | — | — |
| 2 | 81 | 4.5 | 4.5 | 10 | — |
| 3 | 89 | 4.5 | 4.5 | — | 2 |

Figure 19:
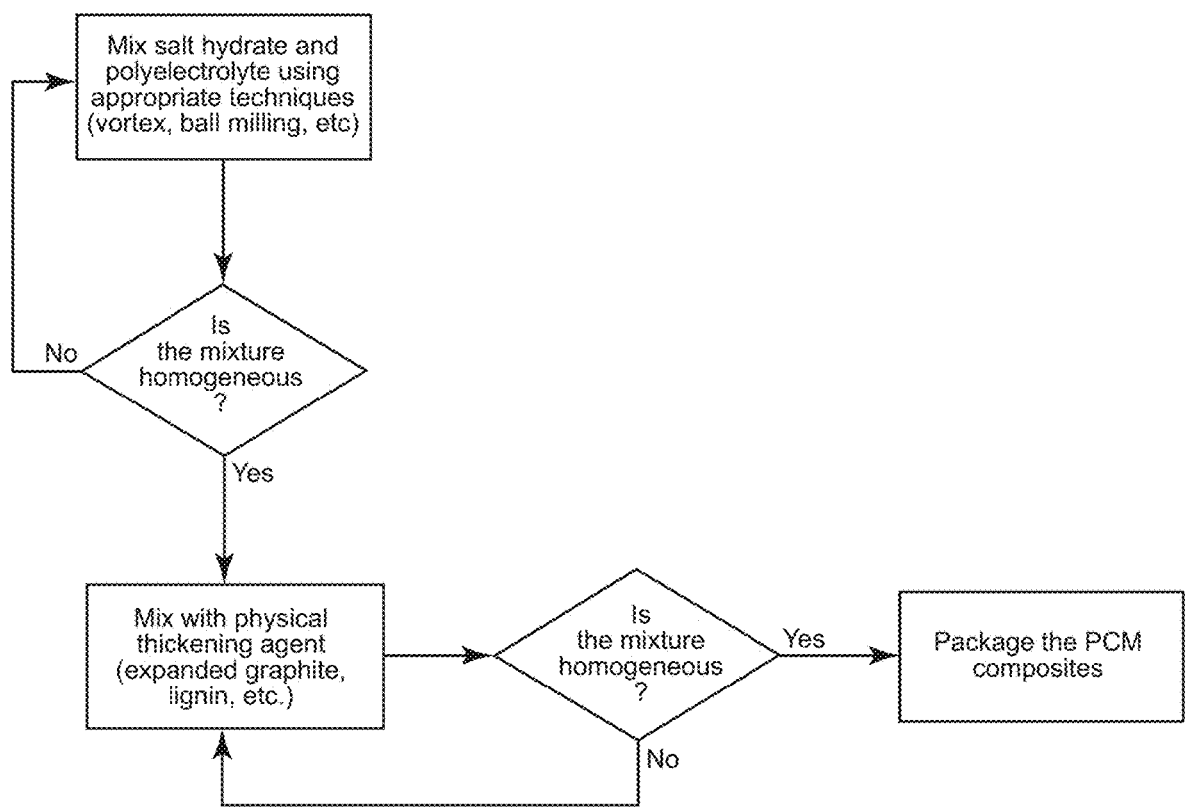

In summary, the phase change material composition of the present disclosure is widely applicable to many other salt hydrate based PCMs that are suffering from phase separation. Based on the size and surface charge of the salt particles, polyelectrolytes with different charges, ionic strength, and chain length can be used. Proper modification of the salt particles is expected to result in salt hydrates with high thermal energy storage capacity and stability. FIG. 19 shows a simplified flow diagram showing the preparation of such salt hydrate PCM composites.

The invention claimed is:

1. A phase change material composition for latent heat storage, comprising:
   a salt hydrate having a melting temperature ($T_m$) of from 1° C. to 100° C. as determined in accordance with ASTM E793, wherein the salt hydrate comprises sodium sulfate decahydrate ($Na_2SO_4 \cdot 10H_2O$); and
   a stabilizing matrix comprising a dextran sulfate salt that stabilizes sodium sulfate decahydrate during phase transformation of the sodium sulfate decahydrate to reduce phase separation.

2. The phase change material composition of claim 1, wherein the phase change material composition exhibits improved congruent melting as compared to a composition substantially free of the stabilizing matrix.

3. The phase change material composition of claim 1, wherein the salt hydrate and the stabilizing matrix are present in a weight ratio of from 100:1 to 10:1.

4. The phase change material composition of claim 1 further comprising a nucleating agent.

5. The phase change material composition of claim 4, wherein the nucleating agent is selected from the group of sodium tetraborate decahydrate, sodium phosphate dibasic dodecahydrate, and a combination thereof.

6. The phase change material composition of claim 4, wherein the salt hydrate and the nucleating agent are present in a weight ratio of from 1:50 to 50:1.

7. The phase change material composition of claim 1, wherein the salt hydrate has a melting temperature ($T_m$) of from 5° C. to 60° C. as determined in accordance with ASTM E793.

8. The phase change material composition of claim 1, wherein the salt hydrate has an energy density in an amount of from 20 to 200 kWh/m³ as determined in accordance with ASTM E793.

9. A composite material adapted to be in the presence of an energy source, the energy source adapted to provide heat, the composite material comprising:
   a support adapted to be in thermal communication with the energy source; and
   a phase change material composition according to claim 1, the phase change material composition disposed within the support;
   wherein the heat provided by the energy source has a temperature greater than the melting temperature of the phase change material.

10. The composite material of claim 9, wherein the phase change material composition exhibits improved congruent melting as compared to a composition substantially free of the stabilizing matrix.

\* \* \* \* \*